United States Patent
Mestery et al.

(10) Patent No.: US 11,044,173 B1
(45) Date of Patent: Jun. 22, 2021

(54) MANAGEMENT OF SERVERLESS FUNCTION DEPLOYMENTS IN COMPUTING NETWORKS

(71) Applicant: Cisco Technology, Inc., San Jose, CA (US)

(72) Inventors: Kyle Andrew Donald Mestery, Woodbury, MN (US); Ian Wells, San Jose, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 0 days.

(21) Appl. No.: 16/741,162

(22) Filed: Jan. 13, 2020

(51) Int. Cl.
*H04L 12/24* (2006.01)
*G06N 20/00* (2019.01)
*H04L 12/801* (2013.01)
*G06N 7/00* (2006.01)

(52) U.S. Cl.
CPC ......... *H04L 41/5051* (2013.01); *G06N 7/005* (2013.01); *G06N 20/00* (2019.01); *H04L 47/127* (2013.01); *H04L 41/508* (2013.01)

(58) Field of Classification Search
CPC . H04L 41/5051; H04L 41/508; H04L 47/127; G06N 20/00; G06N 7/005
See application file for complete search history.

(56) References Cited

U.S. PATENT DOCUMENTS

| 7,065,618 | B1* | 6/2006 | Ghemawat | H04L 67/1095 711/161 |
|---|---|---|---|---|
| 9,794,352 | B2 | 10/2017 | Qiang | |
| 10,361,985 | B1* | 7/2019 | Shveykin | H04L 67/2842 |
| 10,673,698 | B2* | 6/2020 | Johnston | H04L 43/0894 |
| 10,678,586 | B1* | 6/2020 | Hecht | G06F 9/5077 |
| 2017/0242689 | A1* | 8/2017 | Cheng | G06F 8/31 |
| 2018/0101403 | A1* | 4/2018 | Baldini Soares | G06Q 20/22 |
| 2018/0176070 | A1 | 6/2018 | Shafiee et al. | |
| 2018/0254998 | A1* | 9/2018 | Cello | H04L 41/5009 |
| 2019/0004871 | A1* | 1/2019 | Sukhomlinov | G06F 9/541 |
| 2019/0007458 | A1* | 1/2019 | Shulman | H04L 63/1433 |

(Continued)

FOREIGN PATENT DOCUMENTS

EP 3561671 A1 10/2019

OTHER PUBLICATIONS

International Search Report and Written Opinion from the International Searching Authority, dated Apr. 22, 2021, 10 pages, for corresponding International Patent Application No. PCT/US2020/067559.

(Continued)

*Primary Examiner* — Blake J Rubin
(74) *Attorney, Agent, or Firm* — Polsinelli PC

(57) ABSTRACT

Systems, methods, computer-readable media are disclosed for influencing serverless function placement across hosts within a network. A method includes receiving a notification from a network component, the notification indicating a performance bottleneck in association with one or more instances of a serverless function being executed at one or more hosts of a network; initiating at least one additional instance of the serverless function in response to the performance bottleneck; and sending a message to the network component identifying the at least one additional instance of the serverless function, the network component directing network traffic based on the message.

20 Claims, 10 Drawing Sheets

(56) References Cited

U.S. PATENT DOCUMENTS

| | | | |
|---|---|---|---|
| 2019/0014171 A1* | 1/2019 | Stein | G06F 9/542 |
| 2019/0026150 A1 | 1/2019 | Shimamura et al. | |
| 2019/0028552 A1* | 1/2019 | Johnson, II | H04L 67/02 |
| 2019/0044886 A1* | 2/2019 | Bernat | H04L 49/205 |
| 2019/0079804 A1 | 3/2019 | Thyagarajan | |
| 2019/0104182 A1 | 4/2019 | Elzur | |
| 2019/0140913 A1* | 5/2019 | Guim Bernat | H04L 41/5019 |
| 2019/0149480 A1* | 5/2019 | Singhvi | H04L 47/78 709/226 |
| 2019/0166221 A1* | 5/2019 | Shimamura | G06F 9/5072 |
| 2019/0196879 A1 | 6/2019 | Dutta et al. | |
| 2019/0205186 A1* | 7/2019 | Zhang | G06F 9/542 |
| 2019/0208009 A1* | 7/2019 | Prabhakaran | H04L 67/16 |
| 2019/0222518 A1* | 7/2019 | Bernat | H04L 41/5009 |
| 2019/0230154 A1 | 7/2019 | Doshi et al. | |
| 2019/0332483 A1* | 10/2019 | Natanzon | G06F 11/1464 |
| 2019/0377604 A1* | 12/2019 | Cybulski | G06F 9/5044 |
| 2020/0057676 A1* | 2/2020 | Vaikar | H04L 67/1021 |
| 2020/0120120 A1* | 4/2020 | Cybulski | H04W 12/068 |
| 2020/0142735 A1* | 5/2020 | Maciocco | G06F 16/90339 |
| 2020/0349067 A1* | 11/2020 | Syamala | G06F 16/172 |
| 2021/0026692 A1* | 1/2021 | Mestery | G06F 9/505 |

OTHER PUBLICATIONS

ETSI, "Network Functions Virtualization (NFV); Use Cases," ETSI GR NFV 001 V1.2.1 (2017-15), 81 pages.

International Search Report and Written Opinion from PCT Application No. PCT/US2020/067559 dated Apr. 22, 2021.

Network Functions Virtualisation (NFV); Use Cases", ETSI Draft Specification; NFV 001, European Telecommunications Standards Institute (ETSI), 650, Route Des Lucioles; F-06921 Sophia-Antipolis ; France vol. ISG NFV Network Functions Virtualisation, No. V1.2.2 Feb. 19, 2019 (Feb. 19, 2019), pp. 1-92, XP014377976, Retrieved from the Internet: URL:docbox.etsi.org/ISG/NFV/Open/Drafts/001ed131UseCases/NFV-001ed131v122/gr_NFV001v010202p-Elean.docx [retrieved on Feb. 19, 2019].

* cited by examiner

MANAGEMENT OF SERVERLESS FUNCTION DEPLOYMENTS IN COMPUTING NETWORKS

TECHNICAL FIELD

The present technology pertains in general to the field of computing and, more particularly, to influencing function management in serverless computing networks.

BACKGROUND

Computing environments may offer services such as serverless computing services, or Functions-as-a-Service (FaaS). In FaaS models, functions become the unit of deployment and operation. Their density are typically even greater than containers and are generally more ephemeral in a running environment. In some instances, these functions execute on the order of milliseconds, or even nanoseconds. Furthermore, data pipelines have increased in size and operating on this data in real-time has become more important. Accordingly, there is a need to dynamically control serverless function set up, placement, execution, and destruction.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which.

DETAILED DESCRIPTION

Figure 1A:
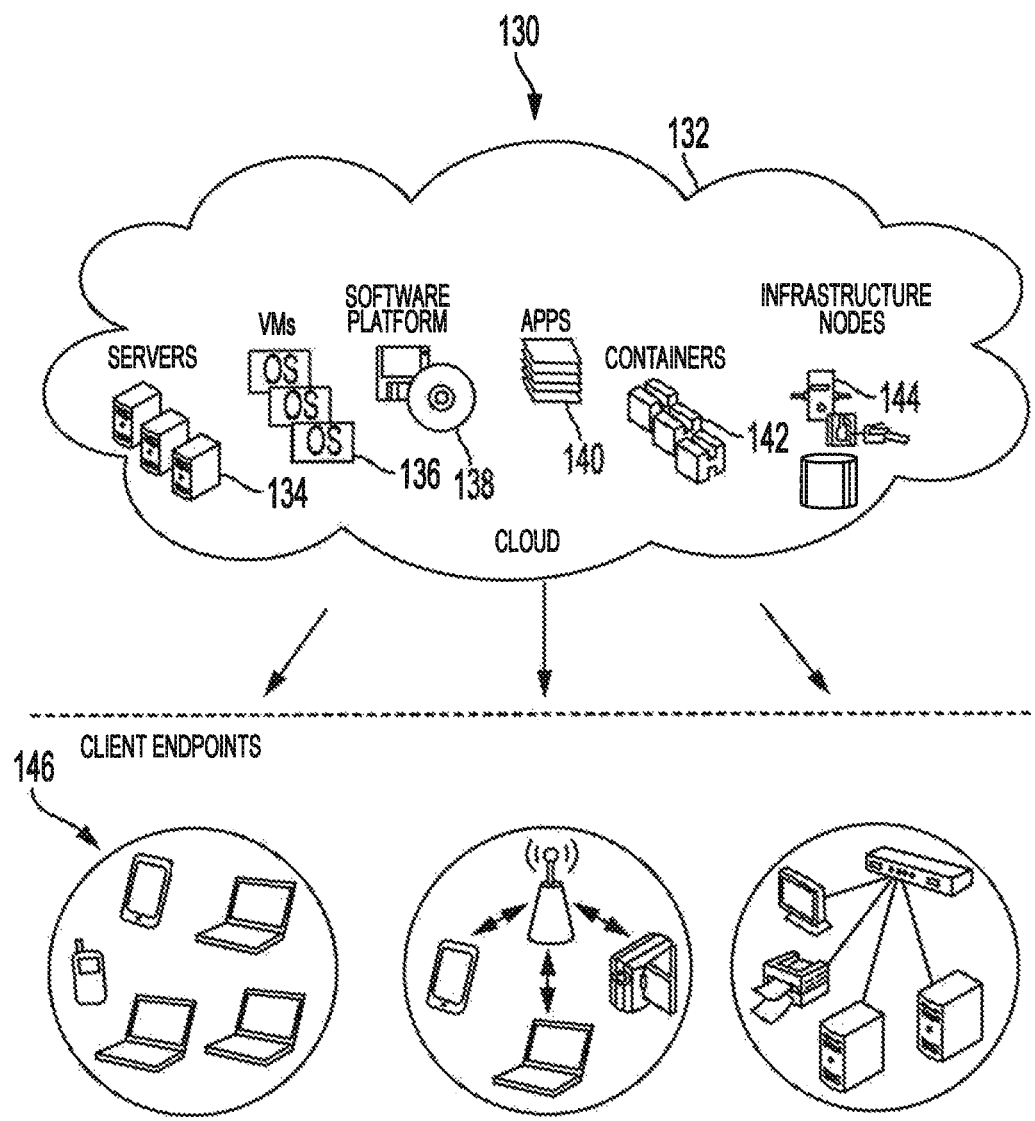
FIGS. 1A-B illustrate example network environments and architectures, according to one aspect of the present disclosure.

Various examples of the disclosure are discussed in detail below. While specific implementations are discussed, it should be understood that this is done for illustration purposes only. A person skilled in the relevant art will recognize that other components and configurations may be used without parting from the spirit and scope of the disclosure.

References to one or an example embodiment in the present disclosure can be, but not necessarily are, references to the same example embodiment; and, such references mean at least one of the example embodiments.

Reference to "one example embodiment" or "an example embodiment" means that a particular feature, structure, or characteristic described in connection with the example embodiment is included in at least one example of the disclosure. The appearances of the phrase "in one example embodiment" in various places in the specification are not necessarily all referring to the same example embodiment, nor are separate or alternative example embodiments mutually exclusive of other example embodiments. Moreover, various features are described which may be exhibited by some example embodiments and not by others. Similarly, various features are described which may be features for some example embodiments but not other example embodiments.

The terms used in this specification generally have their ordinary meanings in the art, within the context of the disclosure, and in the specific context where each term is used. Alternative language and synonyms may be used for any one or more of the terms discussed herein, and no special significance should be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any exemplified term. Likewise, the disclosure is not limited to various examples given in this specification.

Without intent to limit the scope of the disclosure, examples of instruments, apparatus, methods and their related results according to examples of the present disclosure are given below. Note that titles or subtitles may be used in the examples for convenience of a reader, which in no way should limit the scope of the disclosure. Unless otherwise defined, technical and scientific terms used herein have the meaning as commonly understood by one of ordinary skill in the art to which this disclosure pertains. In the case of conflict, the present document, including definitions will control.

Although the terms first, second, etc. may be used herein to describe various elements, these elements should not be limited by these terms. These terms are only used to distinguish one element from another. For example, a first element could be termed a second element, and similarly, a second element could be termed a first element, without departing from the scope of this disclosure. As used herein, the term "and/or," includes any and all combinations of one or more of the associated listed items.

When an element is referred to as being "connected," or "coupled," to another element, it can be directly connected or coupled to the other element or intervening elements may be present. By contrast, when an element is referred to as being "directly connected," or "directly coupled." to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular examples only and is not intended to be limiting. As used herein, the singular forms "a", "an", and "the" are intended to include the plural forms as well, unless the context clearly indicates otherwise. It will be further understood that the terms "comprises". "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Specific details are provided in the following description to provide a thorough understanding of examples. However, it will be understood by one of ordinary skill in the art that examples may be practiced without these specific details. For example, systems may be shown in block diagrams so as not to obscure the examples in unnecessary detail. In other instances, well-known processes, structures and techniques may be shown without unnecessary detail in order to avoid obscuring examples.

In the following description, illustrative examples will be described with reference to acts and symbolic representations of operations (e.g., in the form of flow charts, flow diagrams, data flow diagrams, structure diagrams, block diagrams, etc.) that may be implemented as program services or functional processes include routines, programs, objects, components, data structures, etc., that perform particular tasks or implement particular abstract data types and may be implemented using hardware at network elements. Non-limiting examples of such hardware may include one or more Central Processing Units (CPUs), digital signal processors (DSPs), application-specific-integrated-circuits, field programmable gate arrays (FPGAs), computers or the like.

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

OVERVIEW

In one aspect of the present disclosure, a method for influencing function control in serverless deployments with network heuristics includes receiving a notification from a network component, the notification indicating a performance bottleneck in association with one or more instances of a serverless function being executed at one or more hosts of a network; initiating at least one additional instance of the serverless function in response to the performance bottleneck; and sending a message to the first network component identifying the at least one additional instance of the serverless function, the first network component directing network traffic based on the message.

In another aspect, the network component is a network switch.

In another aspect, the performance bottleneck is in a link connecting the network switch to at least one of the one or more hosts.

In another aspect, the performance bottleneck is at least one buffer saturation at the network switch.

In another aspect, the message is sent to the network switch and at least one other network switch to which the one or more hosts are connected.

In another aspect, the message identifies a host on which the at least one additional instance of the serverless function is being executed.

In another aspect, the notification is generated in response to predicting the performance bottleneck, the performance bottleneck being predicted using one or more of statistic collected on the network component and a machine learning model trained using historical network performance data.

In one aspect of the present disclosure, a device includes memory configured to store computer-readable instructions therein; and one or more processors configured to execute the computer-readable instructions to receive a notification from a network component, the notification indicating a performance bottleneck in association with one or more instances of a serverless function being executed at one or more hosts of a network; initiate at least one additional instance of the serverless function in response to the performance bottleneck; and send a message to the first network component identifying the at least one additional instance of the serverless function, the first network component directing network traffic based on the message.

In one aspect of the present disclosure, one or more non-transitory computer-readable medium comprising computer-readable instructions stored therein, which when executed by at least one processor of network orchestrator, cause the network orchestrator to receive a notification from a network component, the notification indicating a performance bottleneck in association with one or more instances of a serverless function being executed at one or more hosts of a network; initiate at least one additional instance of the serverless function in response to the performance bottleneck; and send a message to the first network component identifying the at least one additional instance of the serverless function, the first network component directing network traffic based on the message.

DETAILED DESCRIPTION

The disclosed technology addresses the need in the art for dynamically influencing management, set up, placement, execution, and destruction of serverless functions across network components in order to reduce redundancy and increase efficiency and overall processing speed of underlying workloads.

Figure 1B:
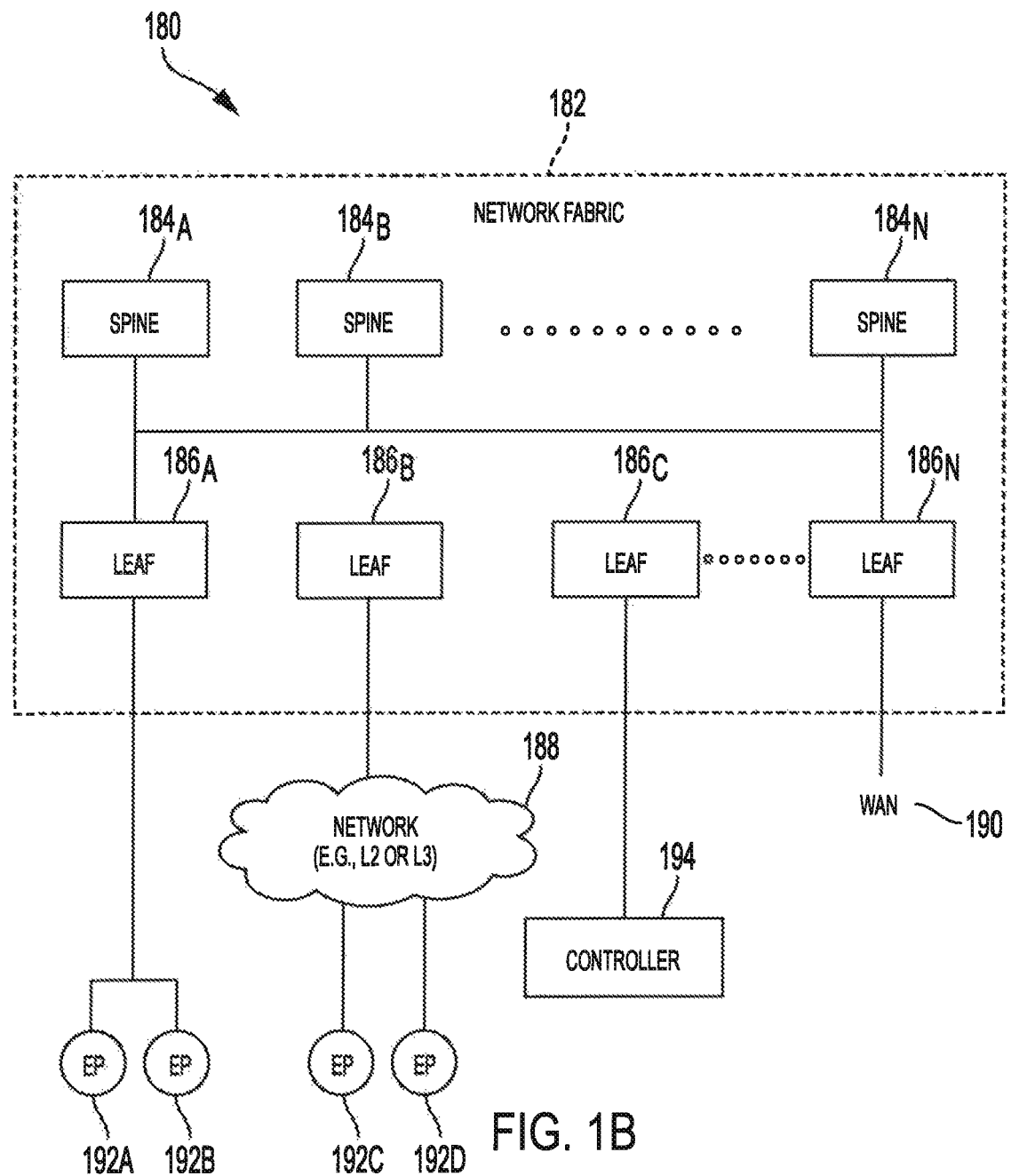
Figure 2:
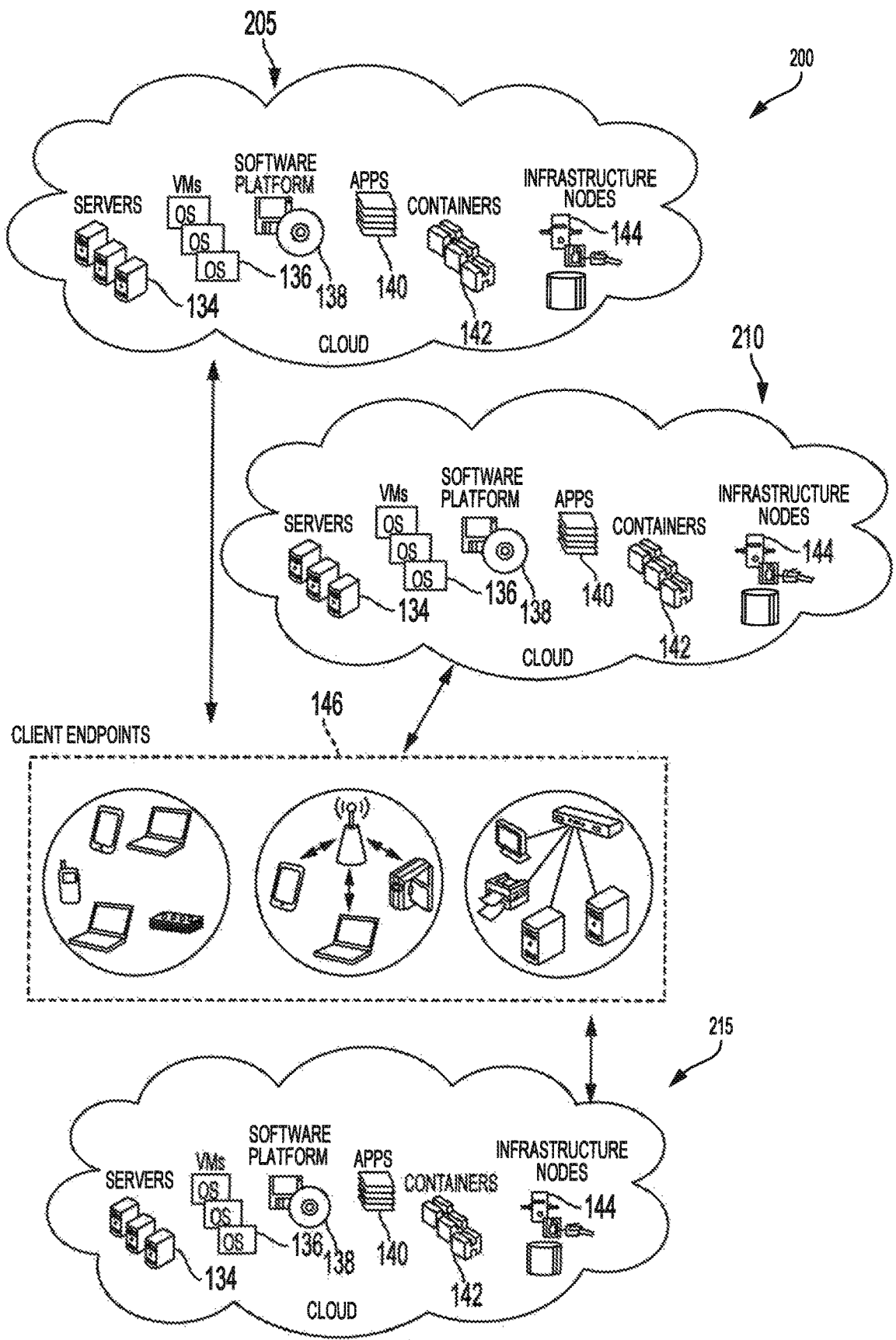
FIG. 2 illustrates a multi-cloud environment, according to one aspect of the present disclosure.

The disclosure begins with a description of example network environments and architectures which can be implemented for distributed streaming systems, as illustrated in FIGS. 1A-B and 2.

FIGS. 1A-B illustrate example network environments and architectures, according to one aspect of the present disclosure. FIG. 1A illustrates a diagram of an example cloud computing architecture (network) 130. The architecture can include a cloud 132. The cloud 132 can include one or more private clouds, public clouds, and/or hybrid clouds. Moreover, the cloud 132 can include cloud elements 134-144. The cloud elements 134-144 can include, for example, servers 134, virtual machines (VMs) 136, one or more software platforms 138, applications or services 140, software containers 142, and infrastructure nodes 144. The infrastructure nodes 144 can include various types of nodes, such as compute nodes, storage nodes, network nodes, management systems, etc. In one example, one or more servers 134 can implement the functionalities of a network controller, which will be described below. Alternatively, such controller can be a separate component that communicates with components of the cloud computing architecture 130.

The cloud 132 can provide various cloud computing services via the cloud elements 134-144, such as software as a service (SaaS) (e.g., collaboration services, email services, enterprise resource planning services, content services, communication services, etc.), infrastructure as a service (IaaS) (e.g., security services, networking services, systems management services, etc.), platform as a service (PaaS) (e.g., web services, streaming services, application development services, etc.), function as a service (FaaS), and other types of services such as desktop as a service (DaaS), information technology management as a service (ITaaS), managed software as a service (MSaaS), mobile backend as a service (MBaaS), etc.

The client endpoints 146 can connect with the cloud 132 to obtain one or more specific services from the cloud 132. The client endpoints 146 can communicate with elements 134-144 via one or more public networks (e.g., Internet), private networks, and/or hybrid networks (e.g., virtual private network). The client endpoints 146 can include any device with networking capabilities, such as a laptop computer, a tablet computer, a server, a desktop computer, a smartphone, a network device (e.g., an access point, a router, a switch, etc.), a smart television, a smart car, a sensor, a GPS device, a game system, a smart wearable object (e.g., smartwatch, etc.), a consumer object (e.g., Internet refrigerator, smart lighting system, etc.), a city or transportation system (e.g., traffic control, toll collection system, etc.), an internet of things (IoT) device, a camera, a network printer, a transportation system (e.g., airplane, train, motorcycle, boat, etc.), or any smart or connected object (e.g., smart home, smart building, smart retail, smart glasses, etc.), and so forth.

FIG. 1B illustrates a schematic block diagram of an example network architecture (network) 180. In some cases, the architecture 180 can include a data center, which can support and/or host the cloud 132. Moreover, the architecture 180 includes a network fabric 182 with spines 184A, 184B . . . , 184N (collectively "spines 184") connected to leafs 186A, 186B, 186C, . . . , 186N (collectively "leafs 186") in the network fabric 182. Spines 184 and leafs 186 can be Layer 2 and/or Layer 3 devices, such as switches or routers. For the sake of clarity, they will be referenced herein as spine switches 184 and leaf switches 186.

Spine switches 184 connect to leaf switches 186 in the fabric 182. Leaf switches 186 can include access ports (or non-fabric ports) and fabric ports. Fabric ports can provide uplinks to the spine switches 184, while access ports can provide connectivity for devices, hosts, endpoints, VMs, or external networks to the fabric 182.

Leaf switches 186 can reside at the boundary between the fabric 182 and the tenant or customer space. The leaf switches 186 can route and/or bridge the tenant packets and apply network policies. In some cases, a leaf switch can perform one or more additional functions, such as implementing a mapping cache, sending packets to the proxy function when there is a miss in the cache, encapsulate packets, enforce ingress or egress policies, etc.

Moreover, the leaf switches 186 can contain virtual switching and/or tunneling functionalities, such as a virtual tunnel endpoint (VTEP) function. Thus, leaf switches 186 can connect the fabric 182 to an overlay (e.g., VXLAN network).

Network connectivity in the fabric 182 can flow through the leaf switches 186. The leaf switches 186 can provide servers, resources, endpoints, external networks, containers, or VMs access to the fabric 182, and can connect the leaf switches 186 to each other. The leaf switches 186 can connect applications and/or endpoint groups ("EPGs") to other resources inside or outside of the fabric 182 as well as any external networks.

Endpoints 192A-D (collectively "endpoints 192") can connect to the fabric 182 via leaf switches 186. For example, endpoints 192A and 192B can connect directly to leaf switch 186A, which can connect endpoints 192A and 192B to the fabric 182 and/or any other of the leaf switches 186. Similarly, controller 194 (which can be the same as controllers described above with reference to FIG. 1A and implemented on one or more servers 134) can connect directly to leaf switch 186C, which can connect controller 194 to the fabric 182 and/or any other of the leaf switches 186. On the other hand, endpoints 192C and 192D can connect to leaf switch 186A and 186B via network 188. Moreover, the wide area network (WAN) 190 can connect to the leaf switches 186N.

Endpoints 192 can include any communication device or resource, such as a computer, a server, a cluster, a switch, a container, a VM, a virtual application, etc. In some cases, the endpoints 192 can include a server or switch configured with a virtual tunnel endpoint functionality which connects an overlay network with the fabric 182. For example, in some cases, the endpoints 192 can represent hosts (e.g., servers) with virtual tunnel endpoint capabilities, and running virtual environments (e.g., hypervisor, virtual machine(s), containers, etc.). An overlay network associated with the endpoints 192 can host physical devices, such as servers; applications; EPGs; virtual segments; virtual workloads; etc. Likewise, endpoints 192 can also host virtual workloads and applications, which can connect with the fabric 182 or any other device or network, including an external network.

FIG. 2 illustrates a multi-cloud environment, according to one aspect of the present disclosure. Multi-cloud environment 200 includes first cloud environment 205, second cloud environment 210, third cloud environment 215 and client endpoints 146. Each one of first cloud environment 205, second cloud environment 210 and third cloud environment 215 can be the same as cloud 132 described above with reference to FIGS. 1A-D. Furthermore, each one of first cloud environment 205, second cloud environment 210 and third cloud environment 215 can have one or more elements of cloud 132 (e.g., servers 134, VMs 136, software platforms 138, Applications 140, containers 142 and infrastructures nodes 144, as described above with reference to FIG. 1B).

Furthermore, each one of first cloud environment 205, second cloud environment 210 and third cloud environment 215 can be located in a separate geographical location and/or operated by a different cloud service provider.

Client endpoints 146 are the same as those described above with reference to FIGS. 1A-B and thus for sake of brevity, will not be further described. Various types of workloads, as requested by one or more client endpoints (or other component of first cloud environment 205, second cloud environment 210 and third cloud environment 215) can be received at one or more of first cloud environment 205, second cloud environment 210 and third cloud environment 215 for processing.

Figure 5:
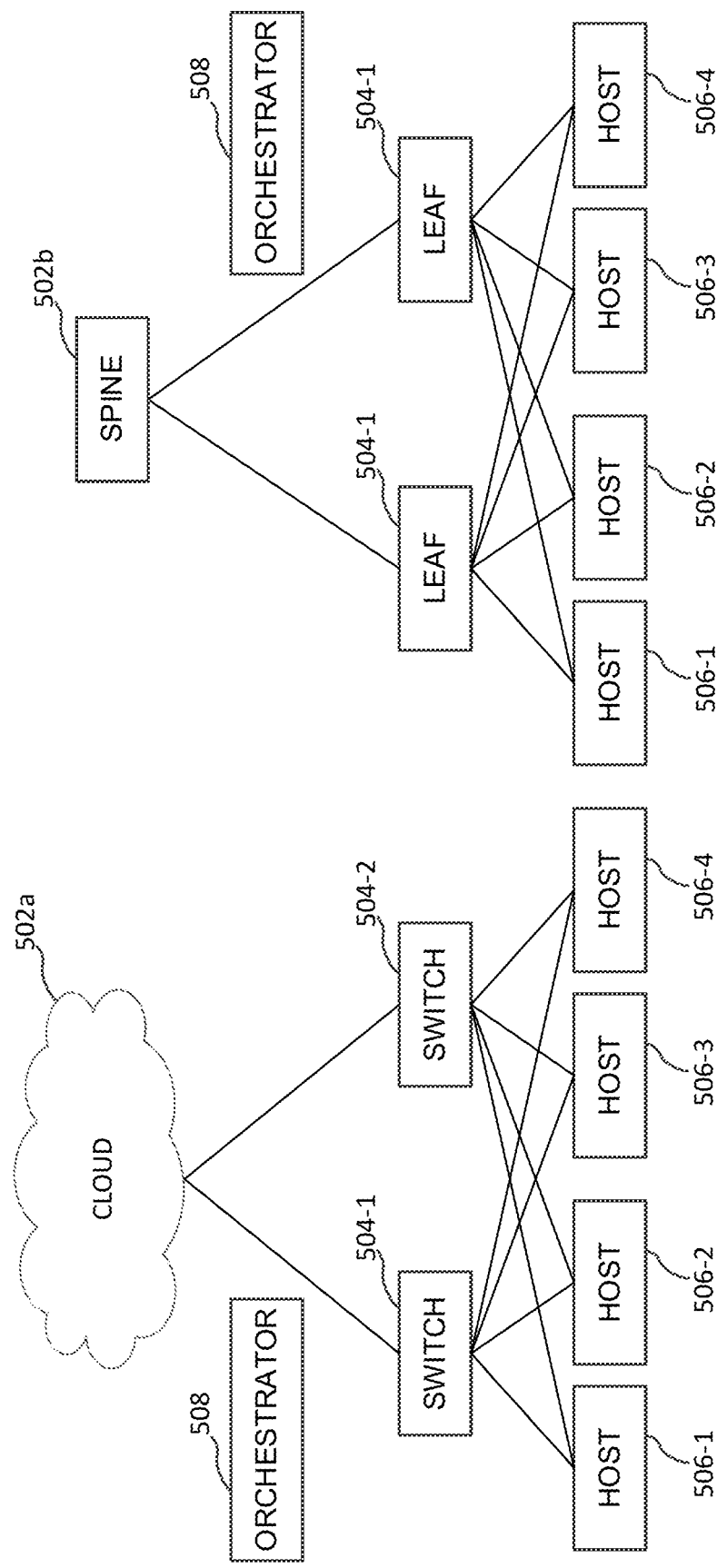
FIGS. 5A-B illustrates an example network environment in which a process for management of serverless functions may be utilized, according to one aspect of the present disclosure.

As will be described below, various application processes and services to be provided as part of a workload requested by a client endpoint and/or other cloud network components can be provided by components in the same one of first cloud environment 205, second cloud environment 210 and third cloud environment 215 or by different components located in different ones of first cloud environment 205, second cloud environment 210 and third cloud environment 215. Accordingly, there is a need to determine, when going from one process (function) on the underlying data to the next as part of a requested service or workload, which cloud environment (network component on such cloud environment) to perform the next function or process on to optimize performance and avoid bottleneck issues. This will be further described with reference to FIGS. 5 and 6.

In one example and while not shown in FIG. 2, a network controller that can be implemented on one or more of first cloud environment 205, second cloud environment 210 and third cloud environment 215 can be configured to manage workload distribution among multiple clouds and determine destination for each function in a chain of functions/processes to be performed as part of a requested workload and process. Such controller can be, for example, the same as controller 194 described above with reference to FIG. 1B.

While FIG. 2 illustrates three different cloud environments, the present disclosure is not limited thereto and there can be many more or fewer number of cloud environments among which various functions are performed.

Figure 3:
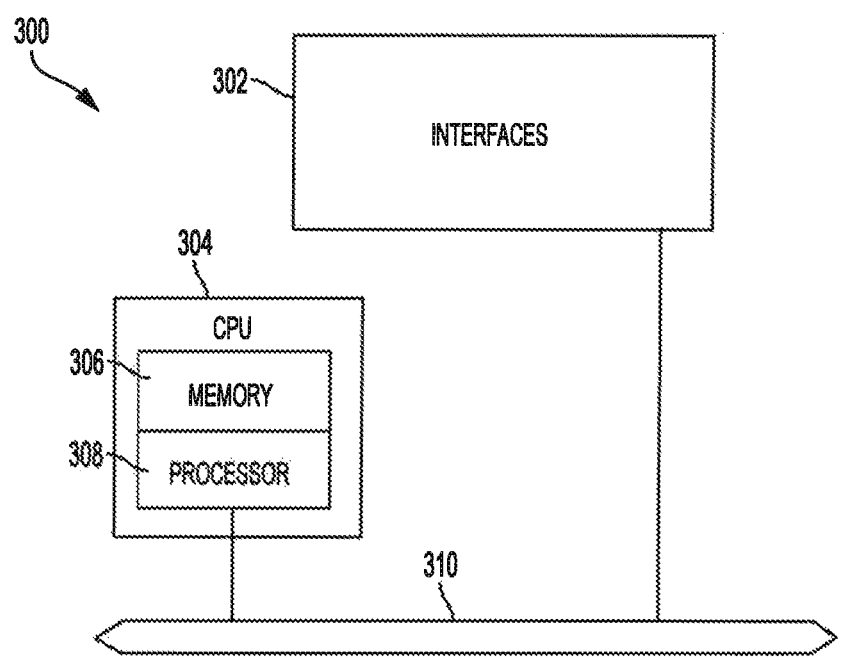
FIG. 3 illustrates an example network device suitable for performing switching, routing, load balancing, and other networking operations, according to an aspect of the present disclosure.

FIG. 3 illustrates an example network device suitable for performing switching, routing, load balancing, and other networking operations, according to an aspect of the present disclosure. In one example, network device 300 can be controller 194 and/or any one of components 122 of FIG. 1A. Network device 300 includes a central processing unit (CPU) 304, interfaces 302, and a bus 310 (e.g., a PC bus). When acting under the control of appropriate software or firmware, CPU 304 is responsible for executing packet management, error detection, and/or routing functions. CPU 304 preferably accomplishes all these functions under the control of software including an operating system and any appropriate applications software. CPU 304 may include one or more processors 308, such as a processor from the INTEL X86 family of microprocessors. In some cases, processor 308 can be specially designed hardware for controlling the operations of network device 300. In some cases, a memory 306 (e.g., non-volatile RAM, ROM, etc.) also forms part of CPU 304. However, there are many different ways in which memory could be coupled to the system.

Interfaces 302 are typically provided as modular interface cards (sometimes referred to as "line cards"). Generally, they control the sending and receiving of data packets over the network and sometimes support other peripherals used with network device 300. Among the interfaces that may be provided are Ethernet interfaces, frame relay interfaces, cable interfaces, DSL interfaces, token ring interfaces, and the like. In addition, various very high-speed interfaces may be provided such as fast token ring interfaces, wireless interfaces, Ethernet interfaces, Gigabit Ethernet interfaces, ATM interfaces, HSSI interfaces, POS interfaces, FDDI interfaces, WIFI interfaces, 3G/4G/5G cellular interfaces, CAN BUS, LoRA, and the like. Generally, these interfaces may include ports appropriate for communication with the appropriate media. In some cases, they may also include an independent processor and, in some instances, volatile RAM. The independent processors may control such communications intensive tasks as packet switching, media control, signal processing, crypto processing, and management. By providing separate processors for the communications intensive tasks, these interfaces allow the master microprocessor 304 to efficiently perform routing computations, network diagnostics, security functions, etc.

Although the system shown in FIG. 3 is one specific network device of the present invention, it is by no means the only network device architecture on which the present invention can be implemented. For example, an architecture having a single processor that handles communications as well as routing computations, etc., is often used. Further, other types of interfaces and media could also be used with network device 300.

Regardless of the network device's configuration, it may employ one or more memories or memory modules (including memory 306) configured to store program instructions for the general-purpose network operations and mechanisms for roaming, route optimization and routing functions described herein. The program instructions may control the operation of an operating system and/or one or more applications, for example. The memory or memories may also be configured to store tables such as mobility binding, registration, and association tables, etc. Memory 306 could also hold various software containers and virtualized execution environments and data.

Network device 300 can also include an application-specific integrated circuit (ASIC), which can be configured to perform routing and/or switching operations. The ASIC can communicate with other components in network device 300 via bus 310, to exchange data and signals and coordinate various types of operations by network device 300, such as routing, switching, and/or data storage operations, for example.

Figure 4:
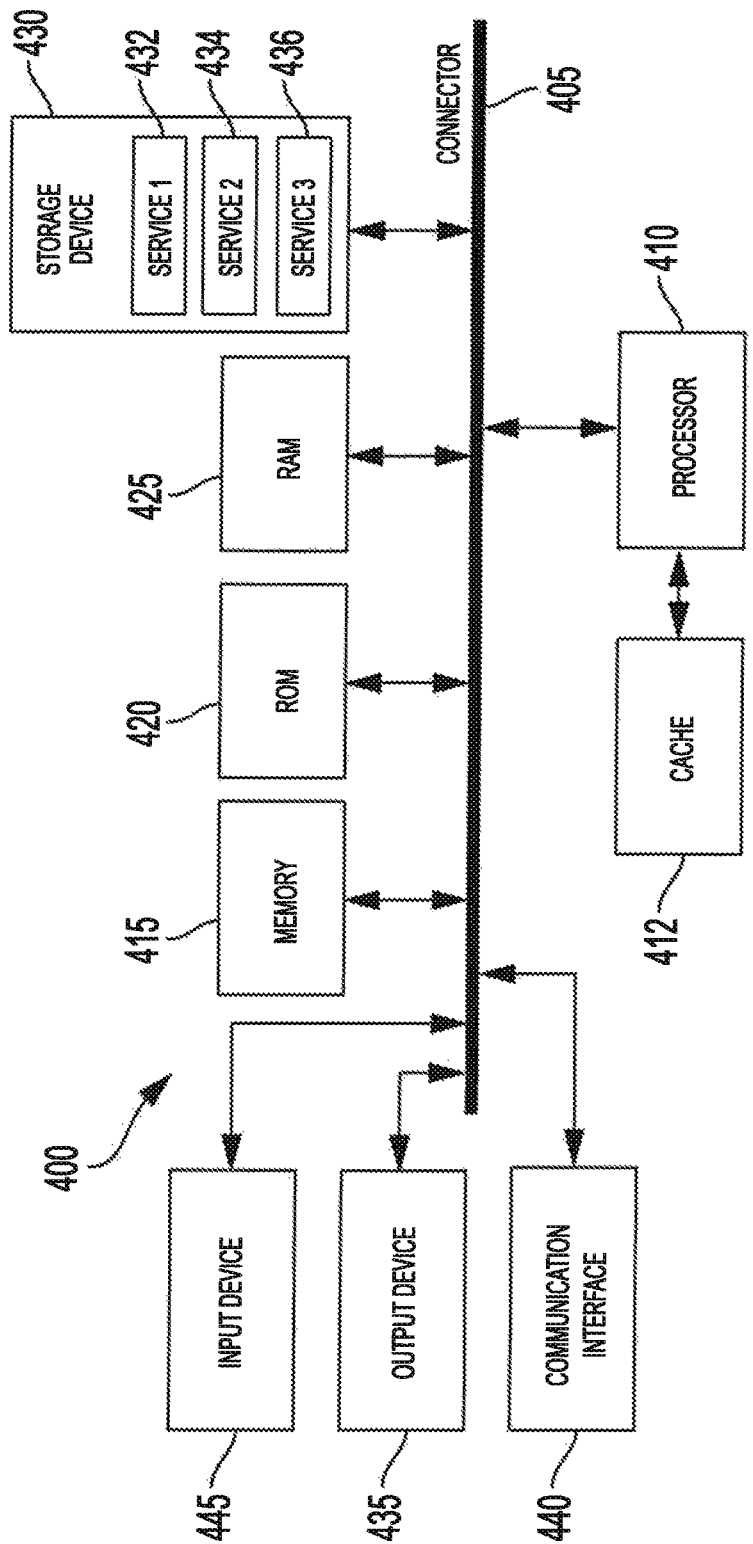
FIG. 4 illustrates a computing system architecture, according to an aspect of the present disclosure.

FIG. 4 illustrates a computing system architecture, according to an aspect of the present disclosure. As shown in FIG. 4, components of system 400 are in electrical communication with each other using a connector 405, such as a bus. Exemplary system 400 includes a processing unit (CPU or processor) 410 and the connector 405 that couples various system components including system memory 415, read only memory (ROM) 320 and random access memory (RAM) 425, to processor 410. System 400 can include a cache 412 of high-speed memory connected directly with, in close proximity to, or integrated as part of the processor 410. System 400 can copy data from memory 415 and/or storage device 430 to cache 412 for quick access by processor 410. In this way, the cache 412 can provide a performance boost that avoids processor 410 delays while waiting for data. These and other modules can control or be configured to control the processor 410 to perform various actions. Other system memory 415 may be available for use as well. Memory 415 can include multiple different types of memory with different performance characteristics. Processor 410 can include any general purpose processor and a hardware or software service, such as Service 1 432, Service 2 434, and Service 3 436 stored in storage device 430, configured to control processor 410 as well as a special-purpose processor where software instructions are incorporated into the actual processor design. Processor 410 may be a completely self-contained computing system, containing multiple cores or processors, a bus, memory controller, cache, etc. A multi-core processor may be symmetric or asymmetric.

To enable user interaction with the computing device 400, an input device 445 can represent any number of input mechanisms, such as a microphone for speech, a touch-sensitive screen for gesture or graphical input, keyboard, mouse, motion input, speech and so forth. An output device 435 can also be one or more of a number of output mechanisms known to those of skill in the art. In some instances, multimodal systems can enable a user to provide multiple types of input to communicate with computing device 400. The communications interface 440 can generally govern and manage the user input and system output. There is no restriction on operating on any particular hardware arrangement and therefore the basic features here may easily be substituted for improved hardware or firmware arrangements as they are developed.

Storage device 430 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 425, read only memory (ROM) 420, and hybrids thereof.

The storage device 430 can include services 432, 434, 436 for controlling the processor 410. Other hardware or software modules are contemplated. The storage device 430 can be connected to the connector 405. In one aspect, a hardware module that performs a particular function can include the software component stored in a computer-readable medium in connection with the necessary hardware components, such as the processor 410, connector 405, output device 435, and so forth, to carry out the function.

As indicated above, for data-intensive workloads (e.g., a log processing workload), there may be several functions to be performed on the underlying data. For instance, in the log processing workload, a first function can be performed (implemented, carried out, etc.) that receives machine logs and converts them to a certain format. The first function can be referred to as the conversion function. A second function can be performed for analyzing the converted machine logs, where the analysis can include filtering, pattern recognition, etc. The second function can be referred to as the analysis function. A third function can be performed for outputting and storing the analyzed machine logs. The third function can be referred to as the output or storing function. Spinning up and taking down serverless functions across one or more cloud computing environments may be necessary in order to service a workload and example embodiments described below provide an optimized placement, management and taking down of serverless functions to address network traffic and bottleneck issues.

FIGS. 5A-B illustrates an example network environment in which a process for management of serverless functions may be utilized, according to one aspect of the present disclosure.

Example environment 500a of FIG. 5A illustrates a cloud environment 502a in communication with switches 504-1, 504-2, via any known or to be developed communication links, which may be referred to collectively as switches 504. The switches 504 are in communication with hosts 506-1, 506-2, 506-3, 506-4, via any known or to be developed communication links, which may be referred to collectively as hosts 506. Although not illustrated here for the purpose of clarity, the switches 504 and hosts 506 are in communication with the controller 194.

Hosts 506 may be servers such as servers 134 that can host functions or processes thereon. In some example embodiments, these functions and processes may be serverless functions or Functions-as-a-Service (FaaS). In these embodiments, serverless functions are a computing paradigm where computing is broken down into bits of compute typically measured in Application Programming Interface (API) calls. These API calls may run in a container runtime. The management of these containers may be handled by an orchestrator (controller) 508, which may be the same as controller 194. These functions may remain running until they are not needed (e.g. idle for more than a timeout value). As will be discussed further below, the orchestrator 508 may implement a process for influencing management, placement, execution, and/or destruction of these serverless functions. While with respect to FIGS. 6-9 below, examples are described where a single serverless function is executed on a given host, the present disclosure is not limited thereto and each host may execute thereon, more than one serverless function.

Example environment 500B of FIG. 5B illustrates an example data center environment 502b, in which spine switch 502b is in communication with switches 504-1, 504-2, or more specifically in this example environment, leaf switches 504-1, 504-2. Spine switch 502b and leaf switches 504 are the same as those described above with reference to FIG. 1D and thus for the sake of brevity, will not be further described. As discussed above with reference to FIG. 5A, the leaf switches 504 are in communication with the hosts 506, both of which are also in communication with the controller 102.

It is to be understood that the discussion of hosts 506 is for explanatory purposes and that one of ordinary skill in the art would understand that the endpoints 192 discussed above with respect to FIG. 1B may be used in place of the hosts 506.

Figure 6:
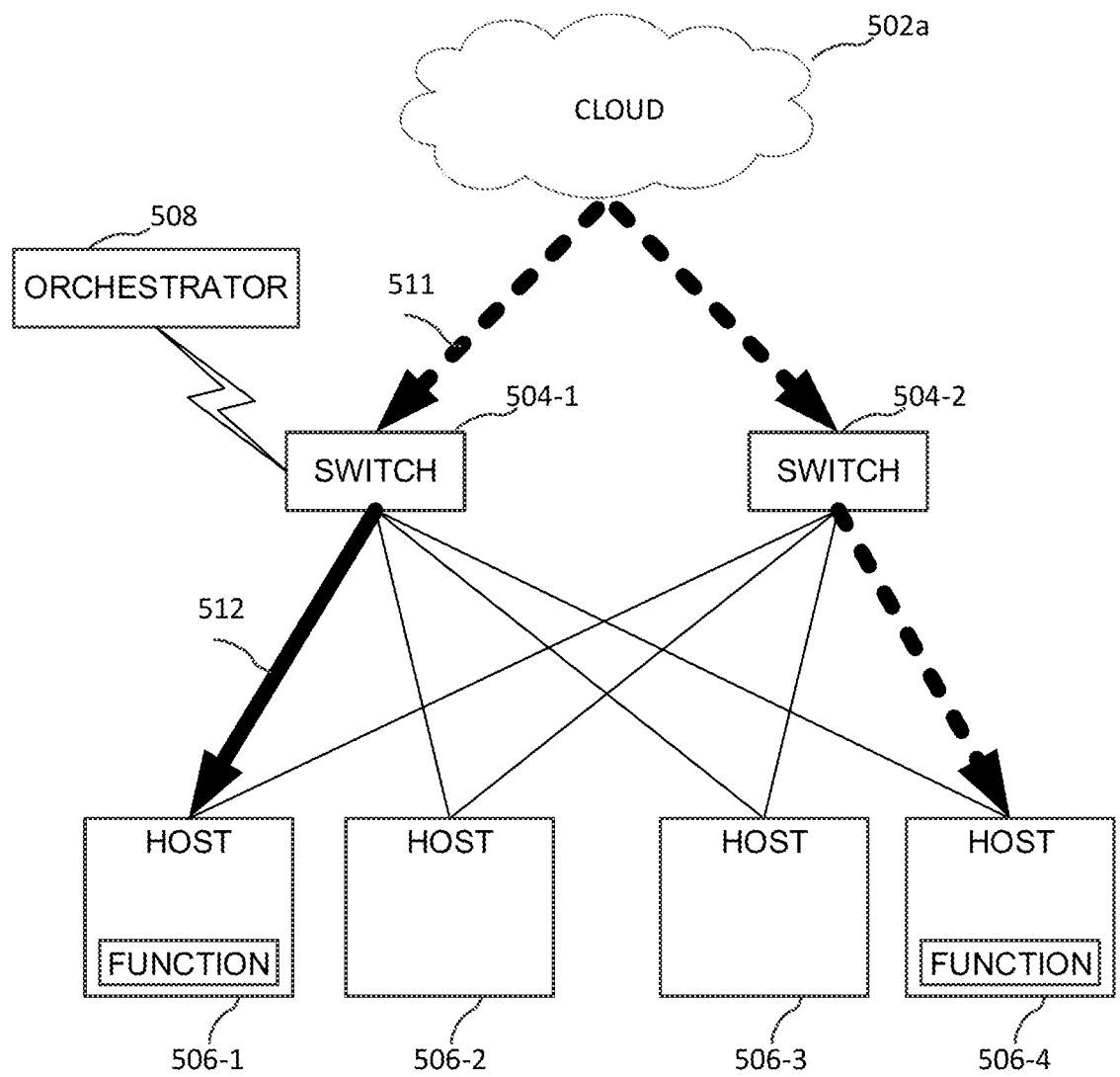
FIG. 6 illustrates an example first phase in network environment implementing a method for influencing function management in serverless deployments with network heuristics.
Figure 7:
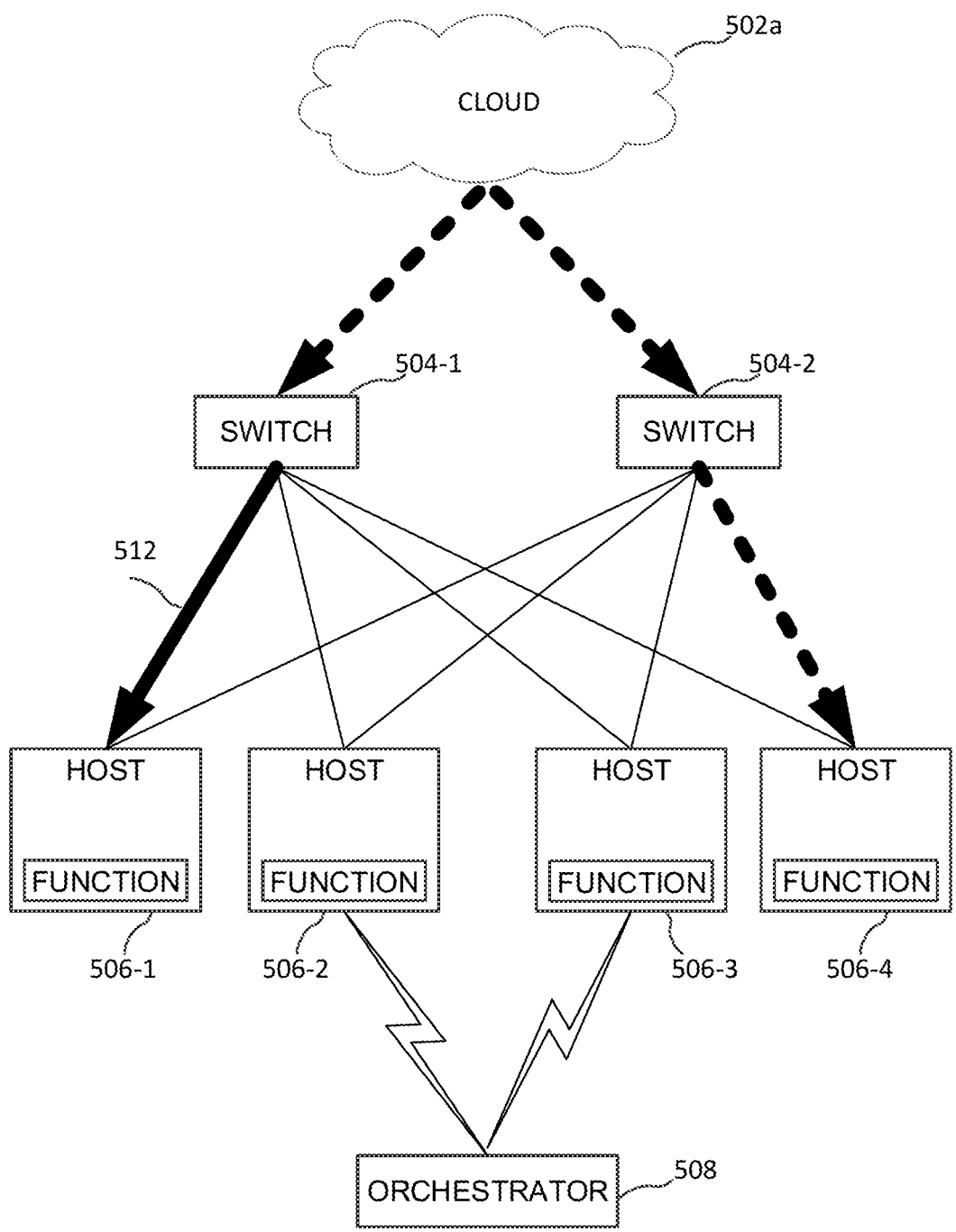
FIG. 7 illustrates an example second phase in network environment implementing a method for influencing function management in serverless deployments with network heuristics.
Figure 8:
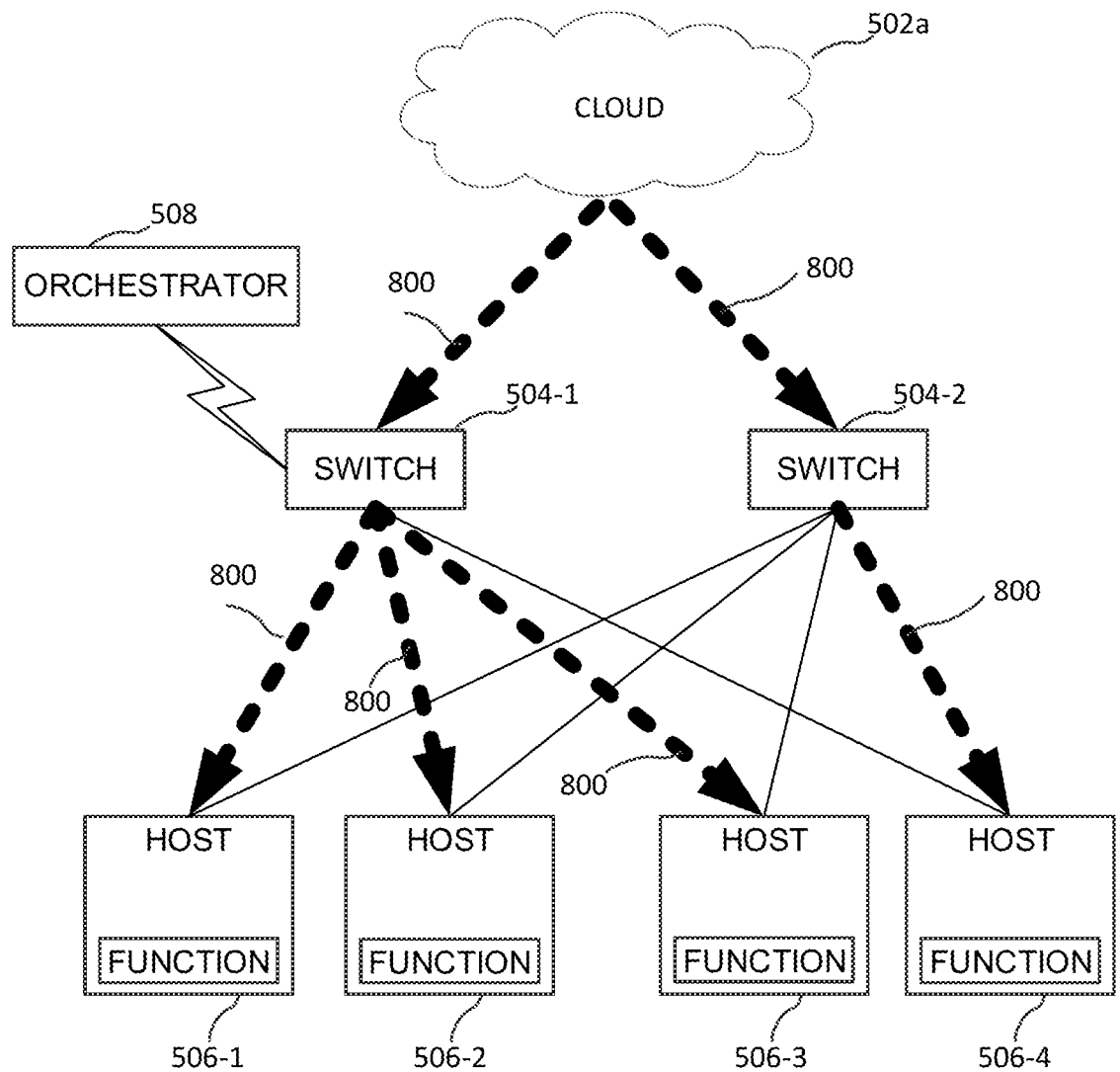
FIG. 8 illustrates an example third phase in network environment implementing a method for influencing function management in serverless deployments with network heuristics.

FIGS. 6-8 illustrate various steps that may occur in a method for influencing management, set up, placement, execution, and/or destruction of serverless functions in the example cloud environment 500a discussed in FIG. 5A. It is to be understood that the method may be implemented in a wide variety of different environments and that the discussion below with regard to these figures and steps are described for clarity and explanation purposes only. With respect to these figures, the dashed arrows indicate data that is being exchanged within the network, while the solid arrows indicate saturated paths. Solid lines without arrowheads indicate paths that may be initiated upon receipt of commands from the orchestrator 508.

FIG. 6 illustrates a network having the cloud environment 502a in communication with network components, such as switches 504-1 and 504-2 (hereinafter switches 504) and subsequently to hosts 506-1, 506-2, 506-3 and/or 506-4 (hereinafter hosts 506). Data is streaming into these switches 504 and is being handled on hosts 506-1, 506-4, which have serverless functions 510-1 and 510-2 executed thereon, respectively, for handling processing of the incoming data. In this example, the serverless function 508-1 in host 506-1 is unable to handle additional API calls. This may be caused by a plurality of different causes, including but not limited to, the host 506-1 being overloaded, the corresponding leaf switch such as leaf switch 504-1 being overloaded/saturated (buffer saturation), the server link (e.g., link 511 and/or link 512) becoming saturated (port saturation), etc. The switch 504-1 detects the serverless function 510-1's inability to handle the additional API calls and sends a notification to the orchestrator 508, using any known or to be developed, wired and/or wireless communication method. In other words, there is a bottleneck in association with one or more instances of a serverless function being executed at one or more hosts 506-1 of the network.

FIG. 7 illustrates the orchestrator 508 communicating with the hosts 506-2, 506-3 to initiate additional serverless functions 510-3 and 510-4 thereon in response to the bottleneck and saturation of link 512 and/or switch 504-1 as described above.

FIG. 8 illustrates the orchestrator 508 sending a message to the switches 504, to inform the switches of the additional serverless functions 510-3 and 510-4 available at hosts 506-2 and 506-3, respectively, via unsaturated links 800. The switches 504 are then aware of the additional capacity available to them on those hosts 506-2, 506-3 and accordingly spread the load to those hosts 506-2, 506-3, which alleviates the bottleneck scenario of FIG. 6 between switch 504-1 and host 506-1.

Figure 9:
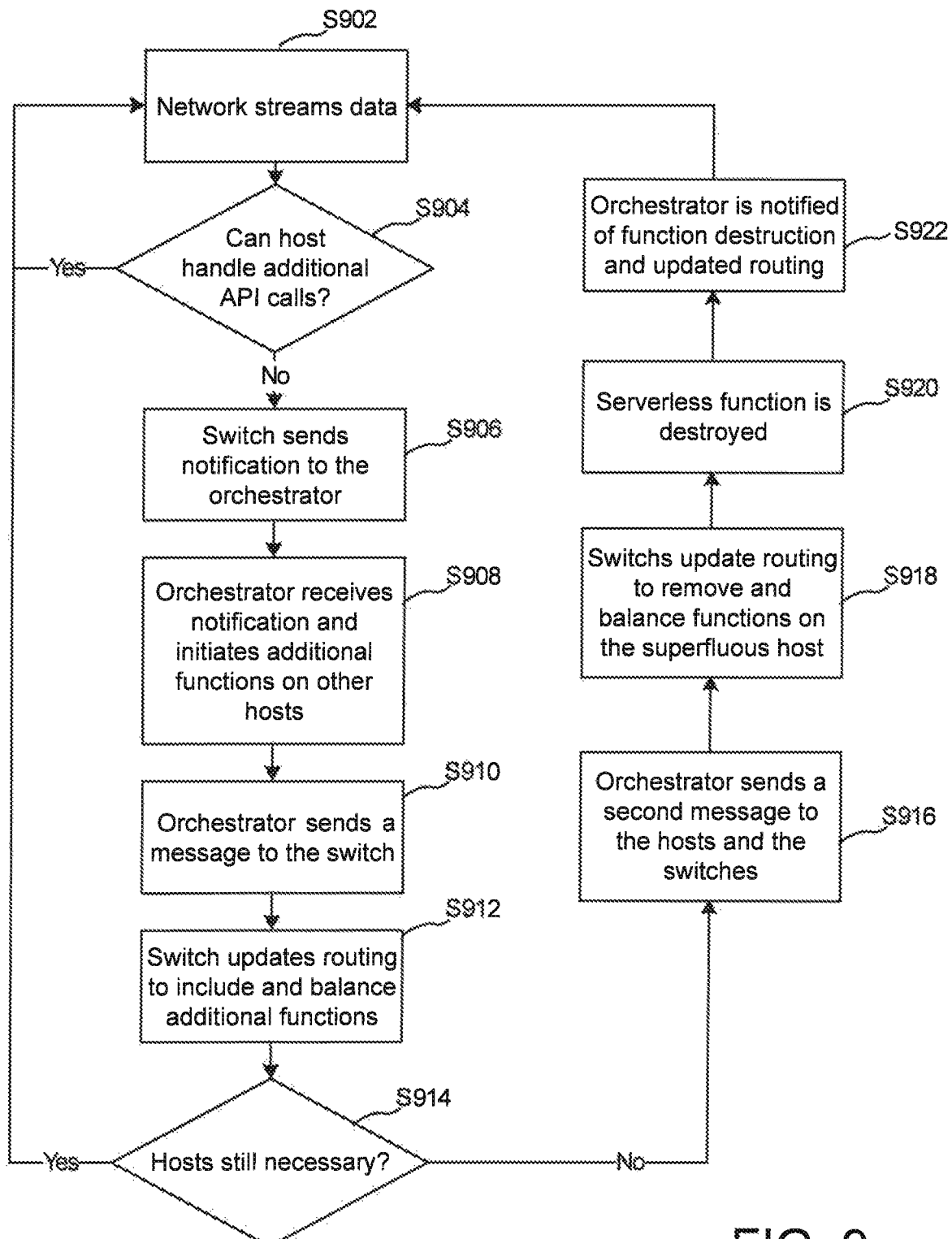
FIG. 9 illustrates a method for influencing function management in serverless deployments with network heuristics.

FIG. 9 illustrates a method 900 of influencing management, set up, placement, execution, and/or destruction of serverless functions. FIG. 9 will be described from the perspective of the orchestrator 508 of FIG. 5A. However, it will be appreciated that one or more processors of controller 194 such as processor 104 execute computer-readable instructions stored on one or more memories such as memory 106 to transform the one or more processors into special purpose processor(s) for carrying out the functionalities and the process of FIG. 6. Furthermore, the method 900 of FIG. 9 may reference FIGS. 6-8 for visualization and discussion purposes, but it is to be understood that the method may be implemented in many other similar environments.

At S902, the orchestrator 508 communicates across the network from the cloud environment 502a through the connected switches 504 and to hosts 506-1, 506-4 to allow data to stream from the cloud 502a to the switch 504-1 to the host 506-1, as demonstrated in FIG. 6. For clarity, the hosts 506-1, 506-4 of FIG. 6 will be referred to as currently active hosts. The data contains API calls that require usage of serverless functions contained in the currently active hosts 506-1, 506-4.

At S904, the switches 504 determines whether the currently active hosts 506-1, 506-4 can handle additional API calls. In some example embodiments, the switch 504-1 determines whether the path (e.g., communication link 511 of FIG. 6) between the cloud 502a to the switches 504, the path (e.g., communication link 512 of FIG. 6) between the switch 504 to any of the hosts 506, and/or switches 504 (e.g., switch 504-1) is/are saturated. For clarity, any and/or all of these paths will be collectively referred to as the path. The path may be physical or virtual links and include ports of the cloud 502a, the switches 54, and the hosts 506. For example, the link between the switch 504-1 and the host 506-1 may become saturated at line rate. In some embodiments, the switches 504 may instead detect saturation of buffers in the switches 504.

If the switch 504 determines that the currently active hosts 506-1, 506-4 are able to handle additional API calls, the method 900 returns to S902, in which the network continues streaming data and utilizing the serverless functions on the currently active hosts 506-1, 506-4.

If the switch 504 determines that the currently active hosts 506-1, 506-4 are unable to handle additional API calls, then the method 90 continues to S906. Example of FIG. 6 shows the path or link 512 between switch 504-1 and host 506-1 is saturated and/or switch 504-1 itself is saturated. Thus, at S906, the switch 504-1 in communication with the saturated path or link communicates with and sends a notification to the orchestrator 508, as further shown in FIG. 6. The notification may notify the orchestrator 508 that the currently active hosts 506-1 is unable to handle additional API calls. In other words, the notification indicates a performance bottleneck in association with one or more instances of the serverless functions being executed at the one or more hosts 506 of the network. In some example embodiments, this may indicate that the path, link, or port of the host 506-1 is saturated. In other words, in some example embodiments, the performance bottleneck may be in the path or link connecting the network switch 504 to the at least one of the one or more hosts 506. In other embodiments, the performance bottleneck may be buffer saturation at the network switch 504-1 or the host 506-1 or both.

At S908 and illustrated in FIG. 7, the orchestrator 508 receives the notification from the switch 504-1 and initiates at least one additional serverless function on at least one of the other hosts 506-2, 506-3 (e.g., serverless functions 510-3 and 510-4, as shown in FIG. 6). In other words, the orchestrator 508 initiates at least one additional instance of the serverless function in response to the performance bottleneck. The additional serverless functions can be configured in the same way the serverless functions are to handle the API calls.

In some example embodiments, the orchestrator 508 may directly determine saturation of each switch 504, host 506, and path or link there between; thus bypassing the need for S906 and the notification aspect of S908.

At S910 and illustrated in FIG. 8, the orchestrator 508 sends a message to switch 504-1 that is in communication with the saturated path or link. The message informs the switch 504-1 of the initiation of additional serverless functions on the other hosts 506-2, 506-3. In other words, the message is sent to the network switch 504-1 that the switch 504-1 may now stream data to the other hosts 506-2, 506-3. In some example embodiments, the message is sent to the network switch 504-1 and at least one other network switch 504-2 to which the one or more hosts 506 are connected. In some example embodiments, the message may identify the host 506-2, 506-3 on which the at least one additional instance of serverless function is being initiated or executed.

At S912 and as illustrated in FIG. 8, the switch 504-1 updates routing or streaming of data to include the additional serverless functions on the other hosts 506-2, 506-3 (e.g., serverless functions 510-3 and 510-4). Furthermore, the switch 504-1 balances data previously streamed to the serverless function 510-1 on host 506-1 to the serverless function on host 506-1 and the additional serverless functions 510-3 and 510-4 on the other hosts 506-2, 506-3. Thus, the other hosts 506-2, 506-3 join hosts 506-1, 506-4 to become the currently active hosts 506. Accordingly, the saturation of the serverless function on host 506-1 is alleviated.

At S914, the orchestrator 508 and hosts 506 communicate to determine whether all of the currently active hosts 506 are still necessary. In some example embodiments, the orchestrator 508 may receive a current data flow and a capacity of data flow from the hosts 506. The orchestrator 508 may then determine, based upon a sum of the current data flow and the capacity of data flow of each host 506, whether the other hosts 506-2, 506-3 are still necessary. For example, if the sum of the current data flow of all hosts 506 is less than the capacity of data flow for three out of the four hosts 506-1, 506-2, 506-4, then the orchestrator 508 may determine that host 506-3 is no longer necessary because the three out of the four hosts 506-1, 506-2, 506-4 are enough to handle all of the API calls.

If the orchestrator 508 determines that all of the currently active hosts 506 are still necessary to handle all of the incoming API calls, then the method 900 returns to S902, at which the network continues streaming data that is handled by all of the active hosts 506.

If the orchestrator 508 determines that not all of the currently active hosts 506 are still required to handle all of the API calls, then the method 900 continues to S916. At S916, the orchestrator 508 sends a second message to the switches 504 and the hosts 506. The second message may inform the switches 504 and the hosts 506 that the orchestrator 508 will destroy functions on superfluous hosts (e.g. 506-2, 506-3).

At S918, the switches 504 update routing to remove and balance data streaming to the serverless functions on the hosts 506. More specifically, the switches 504 stop sending additional data to the superfluous hosts 506-2, 506-3, while the serverless functions on the superfluous hosts 506-2, 506-3 finish handling the data streamed thereto. Additionally, the switches 504 aggregate the data to be send to hosts 506-1, 506-4, where the serverless functions are capable of handling all of the data send thereto. Thus, the switch 504 directs network traffic based on the message received in S916.

In some embodiments, the switches 504 may determine the low saturation and communicate with orchestrator 508. The orchestrator 508 may then receive the communication and adjust the data stream accordingly.

At S920, the switches 504 have stopped sending additional data to the superfluous hosts 506-2, 506-3. Similarly, the serverless functions on the superfluous hosts 506-2, 506-3 have finished handling the data streamed thereto. Thus, the orchestrator 508 communicates with the superfluous hosts 506-2, 506-3 to destroy serverless functions thereon.

At S922, the orchestrator 508 is notified or aware of the successful destruction of the serverless functions on the superfluous hosts 506-2, 506-3 and the updated routing of data to hosts 506-1, 506-4 (i.e. the consolidated route of data flow).

The method 900 then ends or returns to S902, where the network continues streaming the data. In other words, the orchestrator 508 may then repeat the process of FIG. 9.

It is to be understood that the chronology or ordering of these steps are merely for explanatory purposes. One of ordinary skill in the art would understand that these steps may be changed and re-ordered to achieve similar results. For example, the method 90 may instead first move to S914 in place of S904, in which the method first determines whether the orchestrator 508 should destroy serverless functions rather than initiate serverless functions and continue accordingly.

In some embodiments, the orchestrator 508 may also log instances of initiation and/or destruction of serverless functions at S908 and S920, respectively. In another example, the orchestrator 508 may collect statistics such as statistics for various switch interfaces to understand packet flow in/out rates and thus available/used bandwidths at various switches. Another example statistic is the buffer count at each of the switches. Using the collected statistics, orchestrator 508 can determine occurrence (or termination) of bottlenecks and thus the need for initiation (or destruction) of instances of serverless functions on one or more hosts 506.

In another example, the orchestrator 508 may also log the conditions and general trends of the types of data being streamed prior to the initiation and/or destruction of the serverless functions. Furthermore, the logged data (and optionally collected statistics described above) may be used to train a machine learning algorithm to empower the orchestrator 508 to develop predictions of instances or situations that may require additional or fewer serverless functions on additional or fewer hosts 506. In other words, the data and the machine learning algorithm will allow the orchestrator 508 to dynamically determine, prior to actual saturation of paths, whether additional or fewer serverless functions need to be initiated or destroyed on additional or fewer hosts 506. Thus, at S904 and S914 the orchestrator 508 may determine, in addition to whether the hosts 506 can handle additional API calls or if the hosts 506 are still necessary, whether the hosts 506 will need additional capacity or if the hosts 506 will have more than enough capacity to handle API calls in the near term. Accordingly, the orchestrator 508 may send a notification that is generated in response to a prediction of the performance bottleneck, such that the bottleneck performance is predicted using a machine learning model trained using historical network performance data.

Examples described above with reference to the accompanying figures provide an improvement to one or more aspects of existing methods and systems for optimizing placement of workloads across multiple clouds (a network of distributed cloud environments). Such optimization plays an important role in the technological field of modern software services, many components of which have complex dependencies and operate in real-time and in a distributed fashion. It is an important factor for any network operator using these services to optimize the usage of available network resources and reduce the associated costs in order to provide their customers with better and more efficient services. For example, there are costs associated with performing certain functions at certain locations within a cloud network and/or migrating underlying processed (or to be processed data) from one cloud environment to another, as described above. A blind (random) selection of a cloud environment for implementing a network function on the underlying data can increase a network operator's resource consumption and/or cost. Therefore, it is important to provide a method, as described above, for determining a cloud environment for implementing a network function on the underlying data, which improves network resource consumption and reduces associated costs for network operators.

For clarity of explanation, in some instances the present technology may be presented as including individual functional blocks including functional blocks comprising devices, device components, steps or routines in a method embodied in software, or combinations of hardware and software.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory. USB devices provided with non-volatile memory, networked storage devices, and so on.

Devices implementing methods according to these disclosures can comprise hardware, firmware and/or software, and can take any of a variety of form factors. Typical examples of such form factors include laptops, smart phones, small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

Claim language reciting "at least one of" refers to at least one of a set and indicates that one member of the set or multiple members of the set satisfy the claim. For example, claim language reciting "at least one of A and B" means A, B, or A and B.

What is claimed is:

1. A method comprising:
    receiving, at an orchestrator, a first notification from a network component, the first notification indicating a performance bottleneck in association with one or more instances of a serverless function being executed atone or more hosts of a network;
    initiating, at the orchestrator, at least one additional instance of the serverless function in response to the performance bottleneck;
    sending, at the orchestrator, a first message to the network component identifying the at least one additional instance of the serverless function, the network component directing network traffic based on the first message;
    determining, at the orchestrator, whether the at least one additional instance of the serverless function is still needed;
    in response to determining the at least one additional instance of the serverless function is not still needed, sending, at the orchestrator, a second message to the network component and host handling the at least one additional instance of the serverless function, the second message informing the network component and host the at least one additional instance of the serverless function is to be destroyed; and
    receiving, at the orchestrator, a second notification that the at least one additional instance of the serverless function has been destroyed.

2. The method of claim 1, wherein the network component is a network switch.

3. The method of claim 2, wherein the performance bottleneck is in a link connecting the network switch to at least one of the one or more hosts.

4. The method of claim 2, wherein the performance bottleneck is at least one buffer saturation at the network switch.

5. The method of claim 2, wherein the first message is sent to the network switch and at least one other network switch to which the one or more hosts are connected.

6. The method of claim 1, wherein the first message identifies the host on which the at least one additional instance of the serverless function is being executed.

7. The method of claim 1, wherein the first notification is generated in response to predicting the performance bottleneck, the performance bottleneck being predicted using one or more of statistic collected on the network component and a machine learning model trained using historical network performance data.

8. A device comprising:
    memory configured to store computer-readable instructions therein; and
    one or more processors configured to execute the computer-readable instructions to:
        receive a first notification from a network component, the first notification indicating a performance bottleneck in association with one or more instances of a serverless function being executed at one or more hosts of a network;
        initiate at least one additional instance of the serverless function in response to the performance bottleneck; and
        send a first message to the network component identifying the at least one additional instance of the serverless function, the network component directing network traffic based on the first message;
        determine whether the at least one additional instance of the serverless function is still needed;
        in response to determining the at least one additional instance of the serverless function is not still needed, send a second message to the network component and host handling the at least one additional instance of the serverless function, the second message informing the network component and host the at least one additional instance of the serverless function is to be destroyed; and
        receive a second notification that the at least one additional instance of the serverless function has been destroyed.

9. The device of claim 8, wherein the network component is a network switch.

10. The device of claim 9, wherein the performance bottleneck is in a link connecting the network switch to at least one of the one or more hosts.

11. The device of claim 9, wherein the performance bottleneck is at least one buffer saturation at the network switch.

12. The device of claim 9, wherein the first message is sent to the network switch and at least one other network switch to which the one or more hosts are connected.

13. The device of claim 8, wherein the first message identifies a host on which the at least one additional instance of the serverless function is being executed.

14. The device of claim 8, wherein the first notification is generated in response to predicting the performance bottleneck, the performance bottleneck being predicted using one or more of statistic collected on the network component and a machine learning model trained using historical network performance data.

15. A non-transitory computer-readable medium comprising computer-readable instructions stored therein, which when executed by at least one processor of a network orchestrator, cause the network orchestrator to:
- receive a first notification from a network component, the first notification indicating a performance bottleneck in association with one or more instances of a serverless function being executed at one or more hosts of a network;
- initiate at least one additional instance of the serverless function in response to the performance bottleneck;
- send a first message to the network component identifying the at least one additional instance of the serverless function, the network component directing network traffic based on the first message;
- determine whether the at least one additional instance of the serverless function is still needed;
  - in response to determining the at least one additional instance of the serverless function is not still needed, send a second message to the network component and host handling the at least one additional instance of the serverless function, the second message informing the network component and host the at least one additional instance of the serverless function is to be destroyed; and
- receive a second notification that the at least one additional instance of the serverless function has been destroyed.

16. The non-transitory computer-readable medium of claim 15, wherein the network component is a network switch.

17. The non-transitory computer-readable medium of claim 16, wherein the performance bottleneck is in a link connecting the network switch to at least one of the one or more hosts.

18. The non-transitory computer-readable medium of claim 16, wherein the performance bottleneck is at least one buffer saturation at the network switch.

19. The non-transitory computer-readable medium of claim 16, wherein the first message is sent to the network switch and at least one other network switch to which the one or more hosts are connected.

20. The non-transitory computer-readable medium of claim 15, wherein the first message identifies the host on which the at least one additional instance of the serverless function is being executed.

\* \* \* \* \*